United States Patent
Delepaut et al.

(10) Patent No.: US 12,348,131 B2
(45) Date of Patent: Jul. 1, 2025

(54) PEAK AND VALLEY CURRENT MODE CONTROL USING DOUBLE COMPENSATION RAMP

(71) Applicant: European Space Agency, Noordwijk (NL)

(72) Inventors: Christophe Delepaut, AG Noordwijk (NL); Hadrien Carbonnier, AG Noordwijk (NL)

(73) Assignee: European Space Agency, Noordwijk (NL)

( * ) Notice: Subject to any disclaimer, the term of this patent is extended or adjusted under 35 U.S.C. 154(b) by 301 days.

(21) Appl. No.: 17/754,055

(22) PCT Filed: Sep. 30, 2019

(86) PCT No.: PCT/EP2019/076474
§ 371 (c)(1),
(2) Date: Mar. 22, 2022

(87) PCT Pub. No.: WO2021/063482
PCT Pub. Date: Apr. 8, 2021

(65) Prior Publication Data
US 2022/0385177 A1 Dec. 1, 2022

(51) Int. Cl.
*H02M 3/04* (2006.01)
*H02M 3/158* (2006.01)

(52) U.S. Cl.
CPC ............ *H02M 3/04* (2013.01); *H02M 3/158* (2013.01)

(58) Field of Classification Search
CPC ...... H02M 3/04; H02M 3/156; H02M 3/1588; H02M 3/158; H02M 3/157
See application file for complete search history.

(56) References Cited

U.S. PATENT DOCUMENTS

| 7,148,669 B2 * | 12/2006 | Maksimovic | H02M 3/157 323/283 |
| 8,080,987 B1 * | 12/2011 | Qiu | H02M 3/156 323/284 |

(Continued)

FOREIGN PATENT DOCUMENTS

CN 108336903 A * 7/2018 .............. H02M 1/12

OTHER PUBLICATIONS

Anwar, Usama et al., "A Unified Approach to Modeling High-Frequency Effects in Current Mode Controlled Pulse Width Modulated Switching Converters" 2018.

(Continued)

*Primary Examiner* — Thienvu V Tran
*Assistant Examiner* — Yahveh Comas Torres
(74) *Attorney, Agent, or Firm* — Knobbe Martens Olson & Bear LLP

(57) ABSTRACT

A method for controlling peak and valley of a controlled current in a switched mode power supply comprising a current mode control loop and being connected to an electrical power source. The method comprises providing an upper compensation ramp signal for controlling a peak of the controlled current, the upper compensation ramp signal being a sawtooth signal with a negative, falling, substantially linear slope ($-S_{e,Upper}$), starting periodically in time. The method further comprising providing a lower compensation ramp signal for controlling a valley of the controlled current, the lower compensation ramp signal being a sawtooth signal with a positive, raising, substantially linear slope ($S_{e,Lower}$), starting periodically in time. The method additionally comprising providing a reference voltage signal ($V_{ref}$), to the control loop, and obtaining a signal indicative of the controlled current (I). Finally, the method comprises comparing alternatingly the signal indicative of the con- (Continued)

trolled current referenced to the reference voltage signal to the lower compensation ramp and the upper compensation ramp, respectively, to switch on or off the electrical power from the electrical power source into the control loop, and switching the electrical power with modulation at a fixed frequency ($f_s$).

12 Claims, 16 Drawing Sheets

(56) References Cited

U.S. PATENT DOCUMENTS

| | | | | |
|---|---|---|---|---|
| 9,780,662 | B1* | 10/2017 | Milanesi | H02M 3/156 |
| 10,523,119 | B2* | 12/2019 | Childs | H02M 3/158 |
| 2005/0168198 | A1* | 8/2005 | Maksimovic | H02M 3/157 |
| | | | | 323/222 |
| 2010/0231272 | A1* | 9/2010 | Chen | H02M 3/1582 |
| | | | | 327/140 |
| 2013/0127557 | A1* | 5/2013 | Houston | H02M 3/156 |
| | | | | 332/112 |
| 2018/0083524 | A1* | 3/2018 | Childs | H02M 3/1588 |
| 2019/0020275 | A1* | 1/2019 | Childs | H02M 3/158 |

OTHER PUBLICATIONS

Carbonnier, Hadrien et al., "Measurements and Discussion of Conductance Control Stability Margins" European Space Agency, 2019.

Cho, B.H et al., "Measurement of Loop Gain with the Digital Modulator" Electrical Engineering Department, Virginia Polytechnic Institute and State University, 1984.

Decoret, Xavier "Fourrier transform of an impulsion train" Jul. 2004 pp. 1-3.

Deisch, Cecil W. "Simple Switching Control Method Changes Power Converter into a Current Source" Bell Laboratories, 1978.

Delepaut, Christophe et al., "Predictive Digital Current Mode Control Open-Loop Gain Robustness Assessment" Jun. 2019.

Delepaut, Christophe et al., "Average Current Control with Asymmetrical Sawtooth or Peak Current Control" Aug. 2019.

Delepaut, Christophe et al., "Average Current Control with Symmetrical Sawtooth or Peak and Valley Current Control" Sep. 2019.

Dixon, Lloyd "Average Current Mode Control of Switching Power Supplies" Unitrode Application Note, U-140, pp. 3-356-3-369.

Middlebrook, R.D. et al., "A General Unified Approach to Modelling Switching-Converter Power Stages" California Institute of Technology, 1976.

O'sullivan, D. et al., "PWM Conductance Control" European Space Research & Technology Centre, Noordwijk, the Netherlands, 1988, pp. 351-359.

Ridley, Raymond B. "A New Small-Signal Model for Current-Mode Control" Ridley Engineering, Inc., Nov. 1990.

Ripamonti, Giacomo et al., "A Dual-Edge Pulsewidth Modulator for Fast Dynamic Response DC-DC Converters" IEEE Transactions on Power Electronics, Jan. 2019, pp. 28-32, vol. 34, No. 1.

Tonicello, F. "Peak and average current controls—Simulation techniques and comparison" 2002.

International Search Report for PCT/EP2019/076474 dated Jun. 4, 2020.

* cited by examiner

| Conductance control | | |
|---|---|---|
| | Technique 1: Asymmetrical conductance control | Technique 2: Symmetrical conductance control |
| | Asymmetrical ACC | Symmetrical ACC |
| P(V)CC /ACC | Asymmetrical sawtooth $90° > \phi_M > 60°$ $0 < F_b/F_s < 1/6$ $\infty dB > G_M > 6\ dB$ | Symmetrical sawtooth $90° > \phi_M > 60°$ $0 < F_b/F_s < 1/3$ $\infty dB > G_M > 6\ dB$ |
| | PCC | PVCC |
| P(V)CC | Asym. Compensation ramp $60° > \phi_M > 0°$ $1/6 < F_b/F_s < 1/2$ $6\ dB < G_M < 0\ dB$ | Double compensation ramp $60° > \phi_M > 0°$ $1/3 < F_b/F_s < 1$ $6\ dB < G_M < 0\ dB$ |

Fig. 8

PEAK AND VALLEY CURRENT MODE CONTROL USING DOUBLE COMPENSATION RAMP

CROSS REFERENCE TO RELATED APPLICATIONS

This application is a U.S. National Phase Application of PCT International Application Number PCT/EP2019/076474, filed on Sep. 30, 2019, designating the United States of America and published in the English language. The disclosures of the above-referenced applications are hereby expressly incorporated by reference in their entireties.

FIELD OF THE INVENTION

The present invention relates to a method of current control in closed-loop for switched mode power supply.

BACKGROUND OF THE INVENTION

In switch mode power supplies (SMPS), average current control or peak current control, globally referred to as conductance control, is generally used in order to control the profile of the output voltage, irrespective of fluctuations of the input voltage and fluctuations in the load current. A current mode feedback control, embedded in a voltage mode feedback control, simplifies indeed the system from a second order system to two first order systems. Alternatively, a single voltage mode feedback control can be implemented, in which case the controller gain includes a derivative gain. This is comparable to current mode control as the derivative of the capacitor voltage at output of the power supply corresponds to the current (in that capacitor).

Such schemes are conventionally used in voltage regulation, such as in switching DC/DC converters, or in other forms of voltage regulation, such as in DC/AC, AC/DC and AC/AC power supplies.

One such converter, utilizing a current control mode, is a Buck converter, including a LC filter, that works by down-converting an input voltage by modulating off and on the switch connected to the input voltage. This in turn changes the average value of the output voltage to the desired level. When the switch is on, the current in the inductor L increases and when the switch is changed to the off-position the current decreases, allowing control of the current provided to the output load.

Another such converter possibly utilizing a current control mode is a Boost converter, including a LC filter as well, that works by up-converting an input voltage by modulating off and on the switch connected at converter output. This in turn changes the average value of the output voltage to the desired level. When the switch is on, the current in the inductor L will increase and when the switch is changed to the off-position the current will decrease, allowing to indirectly control the current provided to the output load.

The working of a Buck or a Boost converter is considered part of the literature. A current control mode is then commonly utilized in order to control the modulation of the switching of the input or output voltage. Such a scheme is implemented by comparing a reference voltage to a modulation signal, on which basis the input or output voltage is switched on or off. The classical modulation signals include asymmetrical triangle sawtooth or compensation ramp, and symmetrical triangle sawtooth. For the sake of closed-loop control, a current measurement signal is subtracted to the reference voltage delivering an error voltage compared to the modulation signal. Accordingly, the signal compared to the triangle sawtooth or compensation ramp incorporates the ripple of the current resulting from the switching operations.

When using a symmetrical or asymmetrical sawtooth modulation signal for the sake of average current control, crossing the sawtooth with rising current generates a turn off while crossing the sawtooth with decreasing current generates a switch on. These modulation profiles have the disadvantage that they are constrained by the inductance current slopes, designated by a rising inductance current signal slope $S_n$ and a falling inductance current signal slope $S_f$, which shall be smaller than the corresponding slope of the sawtooth signal $S_e$, limiting the dynamic capability of the control scheme.

When using peak current control, this constrain is removed, such that the only difference between peak and asymmetrical average current control schemes is that in average current control the condition, $(S_n$ or $S_f)<S_e$ applies, while no such condition applies in a peak current control scheme driven by its compensation ramp. This results in the peak current control scheme having a dynamic capability stronger than the one of the asymmetrical average current control.

Peak current control using an asymmetrical compensation ramp is relevant to asymmetrical conductance control, and has stronger dynamic capability than asymmetrical average current control. Symmetrical average current control has stronger dynamic capability than the asymmetrical one because of the double sampling operation occurring during one switching period. In this context, no one has been able to devise a scheme for symmetrical peak current control.

Further, these compensation ramps have in U.S. Pat. No. 7,148,669 B2 been implemented in predictive digital current controllers for switching power converters. In this document the predictive current controller is applied to peak current with a leading-edge pulse (asymmetrical peak current control) and average current with a triangular pulse width (symmetrical average current control), see section 3 line 25-34. Further, the application, U.S. Pat. No. 7,148,669 B2, provides for a method for producing a controlled output voltage for a switching power converter under current control using pulse width modulation, the switching power converter including a predictive digital current-mode controller and a digital pulse width modulator. The current control results in an unstable output voltage, and the pulse width modulation method is selected to eliminate the instability of the output voltage.

However, U.S. Pat. No. 7,148,669 B2 does not provide a method for symmetrical peak current control, as such a scheme does not exist in the literature arising to the same problems mentioned above.

The limitation in the dynamic capability of the known modulation control profiles has the disadvantage that in order to achieve higher bandwidth you will have to parallel multiple converters, adding electrical components to the circuit complexity.

Hence, an improved control scheme increasing the bandwidth is much valuable.

OBJECT OF THE INVENTION

This connection of improved dynamic capability is envision carrying over to a symmetrical peak current control scheme, if such a scheme exists. It is therefore an object of the present invention to provide such a scheme.

It is a further object of the present invention to provide an alternative to the prior art.

In particular, it may be seen as an object of the present invention to provide a control scheme that solves the above mentioned problems of the prior art with maintaining stability and improving the dynamic capabilities.

SUMMARY OF THE INVENTION

The invention relies on a new discovery made by the inventors in regards to conventional current control modes. The inventors have performed dynamic analysis of conventional average current control based on an asymmetrical sawtooth control profile and surprisingly found out that it is similar to the asymmetrical peak current control scheme. Indeed, they showed that they are governed by the same dynamical equations. The elaboration of the dynamical equation will be described below. It is underlined that no integral gain is considered in the regulator gain of the above-mentioned control schemes. Such integral gain, if needed, may be considered for both schemes, which does not affect their similarities.

Referring to FIG. 1a, a circuit diagram showing an average current control using falling sawtooth is shown. The implementation of such a circuit is known. Accordingly the sawtooth and current measurement are shown in FIG. 1b, wherein the current signal rising and falling slopes, the sawtooth falling slope, the duty-cycle and the switching period are designated by $S_n$, $-S_f$, $-S_e$, $\theta$, and $T_s$.

It can be shown that when considering the sampling of $V_{ref}$ and in case a $\Delta V_{ref}$ impulse is applied just before time $t_k$, the system may respond by a slight variation of the sampling time resulting in a $\Delta I$ signal being triggered, as seen in FIG. 1c. The dynamical equation satisfied by these conditions may be $$-(R_i\Delta I(k)-\Delta V_{ref}(k))=(S_e-S_f)\Delta t$$

and $$\Delta V_{ref}(k)=(S_e+S_n)\Delta t.$$

which may be rewritten as $$\Delta V_{ref}(k)=(S_e+S_n)\Delta t$$

and $$R_i\Delta I(k)=(S_n+S_f)\Delta t.$$

The sampling time variation may be neglected, so to only depend on the current and voltage variations, so that the first time-discrete equation may be written as $$R_i\Delta I(k) = \frac{S_n + S_f}{S_e + S_n}\Delta V_{ref}(k).$$

The signal $\Delta I$ generated by $\Delta V_{ref}$ remains constant until the next sampling time, which may justify the choice of time-discrete model. As seen in FIG. 1d, the system may respond as indicated by dotted line, which may be satisfied by the equation $$R_i\Delta I(k+1)=(S_e-S_f)\Delta t$$

and $$R_i\Delta I(k)=(S_e+S_n)\Delta t.$$

The second order time-discrete equation, neglecting the sampling time variation, may be of the form $$R_i\Delta I(k+1) = \frac{S_e - S_f}{S_e + S_n}R_i\Delta I(k).$$

Due to convergence reasons the stability condition for the control profile may be $$0 < \frac{S_e + S_f}{S_e + S_n} < 2.$$

Combining the equation by linearity may yield the time-discrete equation for the peak current control $$R_i\Delta I(k+1) = \frac{S_e - S_f}{S_e + S_n}R_i\Delta I(k) + \frac{S_n + S_f}{S_e + S_n}\Delta V_{ref}(k+1)$$

and the time transfer function is accordingly $$\frac{R_i I(z)}{\Delta V_{ref}(z)} = \frac{\frac{S_n + S_f}{S_e + S_n}z}{z - \frac{S_e - S_f}{S_e + S_n}}.$$

The inventor has therefore shown that the time transfer function governing asymmetrical average current control is identical to the one governing the behaviour of the peak current control scheme (Ridley, 1991), which leads to the realization that they pertain to the same control technique. For comparison to Ridley 1991, see Eq. (3.6) on page 50 and Eq. (3.3) on page 47. The only difference is that asymmetrical average current control with falling ramp sawtooth is characterised by $S_f<S_e$, while peak asymmetrical average current control workable even if $S_f>S_e$.

The contribution of the inventor to the existing state-of-the-art has consisted in extending this realisation, that peak and asymmetrical average current control is part of a common control system, to the symmetrical average current control case, as no control scheme for symmetrical peak current control has been developed.

The inventor accordingly developed analytical arguments and completed experiments and simulations to confirm the realisation, both analysis and verification demonstrated mutual consistency.

Following the same derivation steps as for the asymmetrical case and considering that in a symmetrical sawtooth the sampling of the reference voltages occurs twice per switching period, a first sampling occurs at the rising sawtooth slope and a second at the falling sawtooth slope, see FIG. 2, such that the equations takes the form $$R_i\Delta I(k) = \frac{S_e - S_n}{S_e + S_f}R_i\Delta I(k-1+\theta) + \frac{S_n + S_f}{S_e + S_f}\Delta V_{ref}(k),$$

$$R_i\Delta I(k+\theta) = \frac{S_e - S_f}{S_e + S_n}R_i\Delta I(k) + \frac{S_n + S_f}{S_e + S_n}\Delta V_{ref}(k+\theta)$$

where the notation follows the case for the asymmetrical control, wherein $S_e$ is rising slope of the sawtooth.

Following the same reasoning, the inventor examined the bandwidth and stability margins as function of current and sawtooth slopes, which can be seen in the table below.

TABLE 1

| $\dfrac{F_b}{F_s}$ $\varphi_M$ $\dfrac{F_{-180°}}{F_s}$ $G_M$ | | $\theta = \dfrac{S_f}{S_n + S_f}$ | | |
|---|---|---|---|---|
| | | 50% | 75% & 25% | → 100% & → 0% |
| $r = \dfrac{S_n + S_f}{2S_e}$ | 0.5 | 0.2163 70.53° 1 9.54 dB | 0.2291 73.13° 1 9.54 dB | 0.25 90° 1 — |
| | 1 | 0.333 60.00° 1 6.02 dB | 0.3580 62.64° 1 6.02 dB | 0.3524 90° 1 — |
| | 2 | 0.4646 48.19° 1 3.52 dB | 0.5107 48.74° 1 3.52 dB | 0.4220 90° 1 — |
| | 4 | 0.5903 36.87° 1 1.94 dB | 0.6528 33.49° 1 1.94 dB | 0.4604 90° 1 — |
| | → ∞ | 1 0° 1 0 dB | 1 0° 1 0 dB | — — 1 — |

The table indicates, for a switching frequency $F_S$, the phase margin $\varphi_M$, the bandwidth frequency $F_b$, the gain margin $G_M$ and its associated frequency $F_{-180°}$, covering the above-mentioned duty-cycle values and for different r parameter values. Some figures are not available because not defined for the concerned limit cases, due to singularities of the system. Strictly speaking, average current control may imply that the sawtooth slopes are larger than the current slopes (in absolute value), hence that r is lower than unity. The model allows however for larger r-values, and Table 1 is filled accordingly.

The essence of Table 1 may show that symmetrical conductance control exhibits dynamics that extend beyond operational conditions relevant to symmetrical average current control. Just as in the asymmetrical case, where (asymmetrical) peak current control extends beyond asymmetrical average current control. Refer in this respect to FIG. 8.

The inventor has in order to utilize this realisation and accompanying dynamics responses in a first aspect developed a control scheme which in a first aspect concerns a method for controlling peak and valley of a controlled current in a switched mode power supply comprising a current mode control loop and being connected to an electrical power source. The method comprises providing an upper compensation ramp signal for controlling a peak of the controlled current, the upper compensation ramp signal being a sawtooth signal with a negative, falling, substantially linear slope, $-S_{e,Upper}$, starting periodically in time.

The method further comprising providing a lower compensation ramp signal for controlling a valley of the controlled current, the lower compensation ramp signal being a sawtooth signal with a positive, raising, substantially linear slope, $S_{e,Lower}$, starting periodically in time. The method additionally comprising providing a reference voltage signal, $V_{ref}$, to the control loop, and obtaining a signal indicative of the controlled current, I. Finally, the method comprises comparing alternatingly the signal indicative of the controlled current referenced to the reference voltage signal to the lower compensation ramp and the upper compensation ramp, respectively, to switch on or off the switch within the converter containing the control loop, and switching the electrical power with modulation at a fixed frequency, $f_s$.

The inventors have realized that using both an upper compensation ramp and a lower compensation ramp for controlling the current peak and valley, respectively, alleviates the bandwidth restrictions related to the previously known control scheme, namely asymmetrical and symmetrical average current mode control (ACC), or peak current control mode (PCC), or valley current control mode (VCC). Specifically, the controlled current may be allowed to change with a slope larger than the slope of the symmetrical sawtooth, $+/-S_e$, which is otherwise a requirement for maintaining workable current control in the above-mentioned average current mode control.

In another view, both the current peak and valley of the controlled current may be controlled, which is otherwise a requirement unachievable by above-mentioned peak current mode control or valley current mode control. The inventors have specifically designed a control scheme, which circumvents the requirements of symmetrical average current control, namely that $S_n < S_e$ and $S_f < S_e$, or the requirement either to control the peak or to control the valley of the current, which has allured the field for many years.

Throughout this specification, the term compensation ramp is preferably understood to mean the linear ramp, starting periodically, used in the known peak current control scheme or the known valley current control scheme, or the currently proposed peak and valley current control scheme.

Likewise, the term asymmetrical sawtooth, is preferably understood to mean the linear ramp, starting periodically, used in asymmetrical average current control scheme.

Further, the term symmetrical sawtooth, is preferably understood to mean the linear falling and rising ramp, starting periodically, used in symmetrical average current control scheme.

Many variations around the above-mentioned formulations regarding referencing of the signal indicative of the controlled current, in connection with the comparison with the compensation ramps are possible. Particularly, the inventors realize that at least the five embodiments mentioned below are equivalent:

In a first embodiment, the signal indicative of the controlled current is referenced to the reference voltage by subtracting the reference voltage from the signal indicative of the controlled current, before comparing the referenced signal to the compensation ramps.

In a second embodiment, the reference voltage is added respectively to each of the compensation ramps, before comparing these referenced compensation ramps to the signal indicative of the controlled current.

In a third embodiment, the signal indicative of the controlled current is referenced to the reference voltage by subtracting the reference voltage from the current signal, and each of the compensation ramps are respectively subtracted therefrom before comparing each of the resulting signals with zero.

In a fourth embodiment, the signal indicative of the controlled current is referenced to the compensation ramps by subtracting respectively each of the compensation ramps from the signal indicative of the controlled current, before comparing the resulting signals with $V_{ref}$.

In a fifth embodiment, the inverse of the ramp can be added to the current, such that the signal is flipped in sign. The basic mechanisms of the invention may then remain the same, as the upper compensation ramp will then have a positive slope, while the lower compensation ramp has a negative slope.

In an embodiment of the invention, the upper compensation ramp signal and the lower compensation ramp signal are separated in voltage by a predetermined offset. In this way, parasitic crossings between the output current signal and the compensation ramps, i.e. "false" crossings, may be minimized or eliminated.

In an embodiment, the lower compensation ramp is reset to a low state when the current signal has crossed the lower compensation ramp, and the upper compensation ramp is reset to a high state when the current signal has crossed the upper compensation ramp. This is another strategy for avoiding parasitic crossings.

In an embodiment, the upper compensation ramp signal and the lower compensation ramp signal are separated in time by a predetermined offset. In this way, the compensation ramps may be tailored to avoid working at the very beginning or end of a compensation ramp, which improves the overall robustness of the control scheme.

The inventors also envision a digital implementation according to another aspect of the invention. Particularly, this aspect concerns a method for controlling peak and valley of a controlled current in a switched mode power supply comprising a current mode control loop, a switch, a digital circuit, and being connected to an electrical power source. The method comprises switching the electrical power with modulation at a fixed frequency, $f_s$, providing a reference voltage signal, $V_{ref}$, to the control loop, and obtaining a signal indicative of the controlled current, I. The method further comprises sampling and converting digitally repeatedly the signal indicative of the controlled current after a switching operation. Then, the method comprises computing from the sampling of the signal indicative of the controlled current, referenced to the reference voltage signal, a predicted switching time for a next switching operation. The predicted switching time is an intersection point with either a virtual upper compensation ramp signal for controlling a peak of the controlled current, the virtual upper compensation ramp signal being a sawtooth signal with a negative, falling, substantially linear slope, $-S_{e,Upper}$, starting periodically in time, or a virtual lower compensation ramp signal for controlling a valley of the controlled current, the virtual lower compensation ramp signal being a sawtooth signal with a positive, raising, substantially linear slope, $S_{e,Lower}$, starting periodically in time. Finally, the method comprises at the predicted switching time, switching off or on, respectively, the switch.

The advantage of such predictive digital control is primarily that there is no need to permanently measure the current to continuously proceed to the analogue to digital conversion of the current measurements. At the contrary, a single measurement is sufficient to forecast the next switching time, allowing a slower, less expensive, analogue to digital converter to be used, and possibly lowering its associated power consumption. Also, based on a single current measurement, the next two switching times may be forecast, which may be effective when duty-cycles close to zero or close to unity apply, as such situation leaves very limited time for sampling or computing between the two successive and close switching operations.

In this context, a virtual compensation ramp is understood to be a mathematical representation of the compensation ramps as disclosed for the first aspect of the invention. Particularly, a virtual compensation ramp may be characterized by one or more parameters like a slope, an amplitude, a period and a phase. Since the methods according to the two aspects are closely linked, they share a number of embodiments, which will be set out herein below. Thus, the below embodiments are explicitly disclosed to be applicable to both the methods.

In an embodiment, the step of obtaining a signal indicative of the controlled current is performed by measuring the controlled current.

In an embodiment, the step of obtaining a signal indicative of the controlled current is performed by obtaining a time-derivative of a voltage developed over a capacitor by the controlled current.

In an embodiment, the switch within the switched mode power supply connected to the electrical power source is switched on/off with pulse width modulation, PWM.

In an embodiment, the fixed switching frequency, $f_s$, of the switched mode power supply is about 1 kHz to about 100 MHz, such as about 10 kHz to about 10 MHz, or even about 100 kHz to about 1 MHz.

In an embodiment, the slope of the upper compensating ramp signal is substantially numerically equal to the slope of the lower compensating ramp signal, $S_{e,Upper}=S_{e,Lower}$.

In an embodiment, the numerical value of the slope of the upper compensating ramp signal is different from the slope of the lower compensating ramp signal, $S_{e,Upper} \neq S_{e,Lower}$.

According to another aspect, the invention concerns a method for voltage mode control in a voltage mode control loop, wherein the voltage mode control loop comprises a current mode control loop according to anyone of the abovementioned embodiments.

According to another aspect, the invention concerns a method for voltage mode control in a voltage mode control loop, wherein the voltage mode control loop comprises a signal indicative of the controlled current obtained by time-derivative of the voltage developed over a capacitor by the controlled current according to anyone of the abovementioned embodiments.

BRIEF DESCRIPTION OF THE FIGURES

The control scheme according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1A:
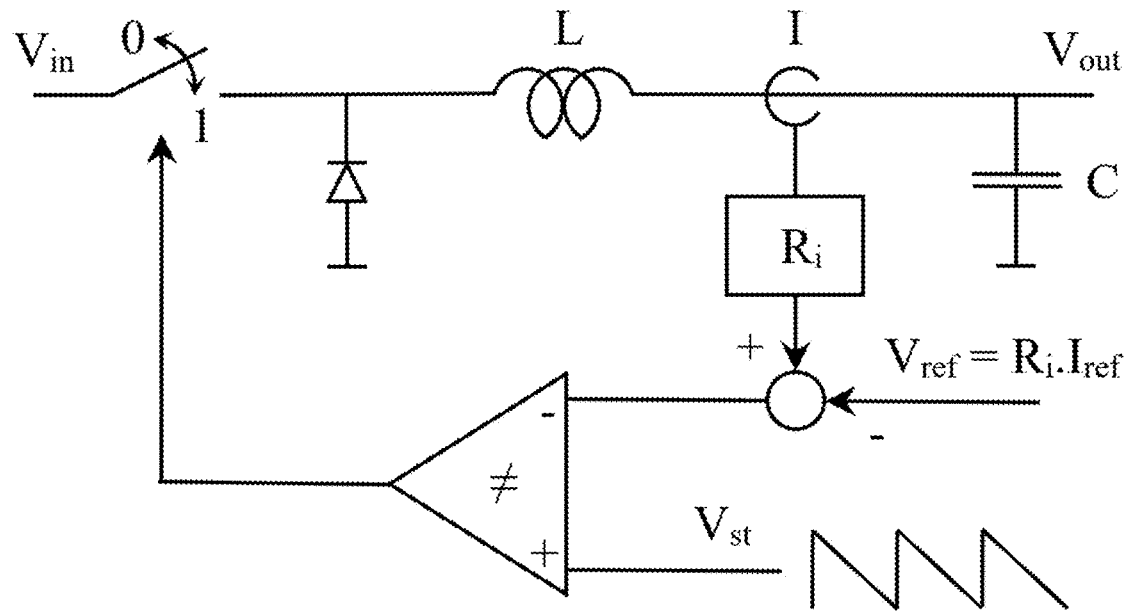
FIG. 1a details a circuit diagram for asymmetrical current control.
Figure 1B:
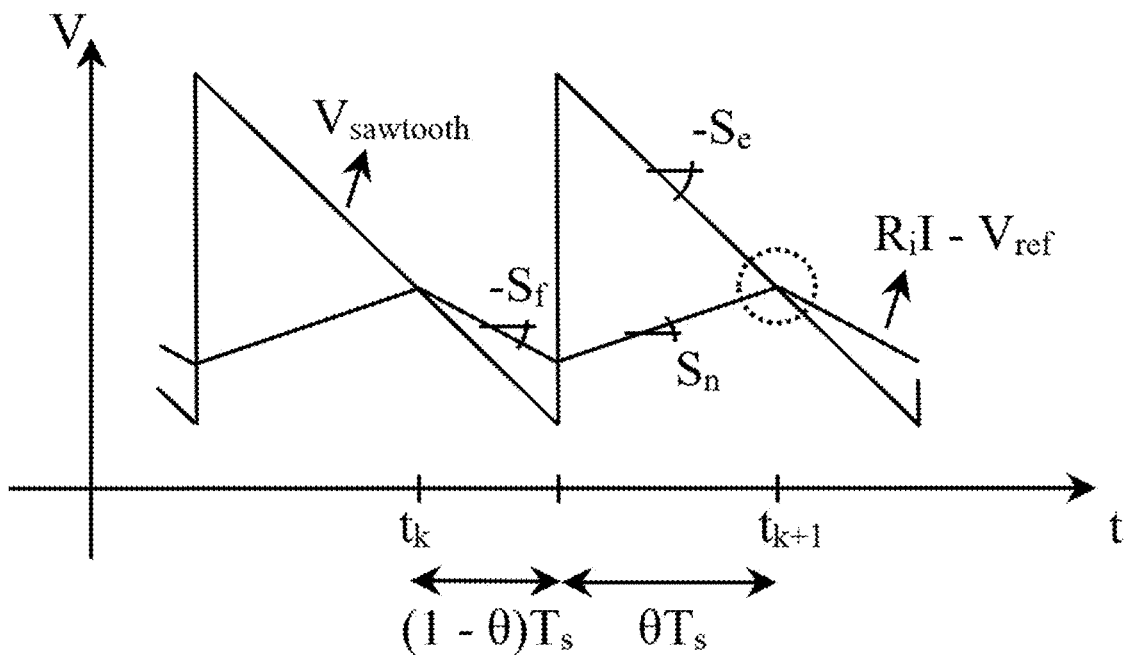
FIG. 1b details the waveforms relevant to asymmetrical current control.
Figure 1C:
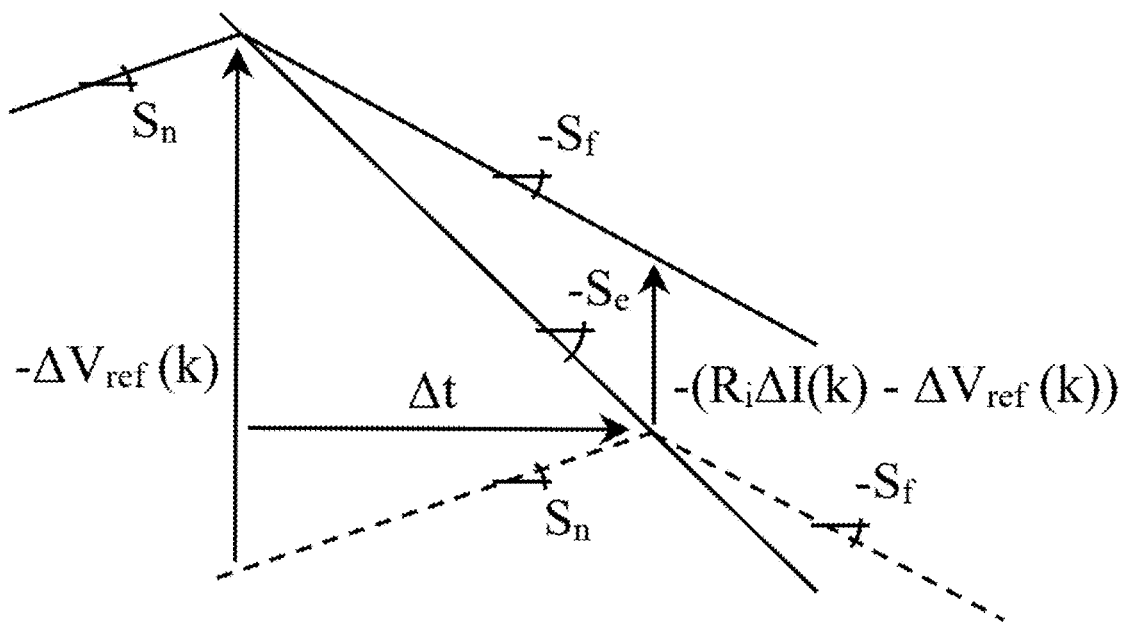
FIG. 1c details the voltage reference response in an asymmetrical current control, FIG. 1d details the current response in an asymmetrical current control, FIG. 2 details the waveforms relevant to symmetrical average current control, FIG. 3 details an embodiment of the peak and valley current control scheme according to the invention, FIG. 4 details an embodiment for the removal of parasitic crossings, FIG. 5a details a second embodiment for the removal of parasitic crossing, FIG. 5b details an embodiment for increased robustness in the system, FIG. 6 details an embodiment of an analogue implementation of the control scheme, FIG. 7 details an embodiment of a digital control circuit for the implementation of the control scheme, FIG. 8 details a comparison of the control schemes in one embodiment completed by the inventors, FIG. 9 details an electrically board according to one embodiment of the invention, FIGS. 10 and 11 details experimental data for an embodiment of the invention
Figure 1D:
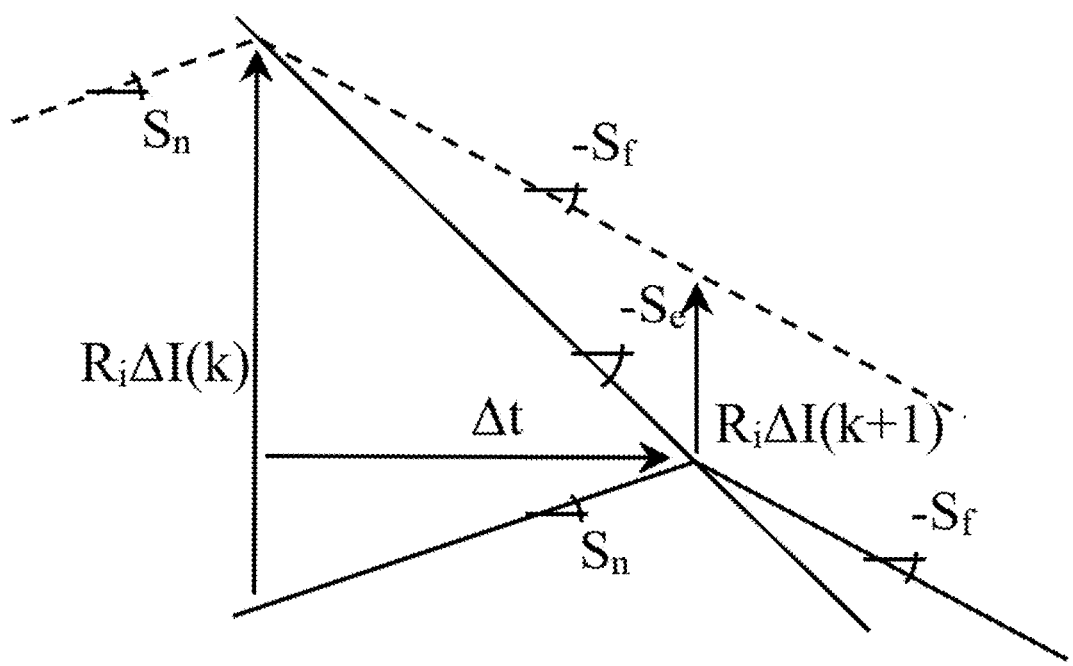
Figure 2:
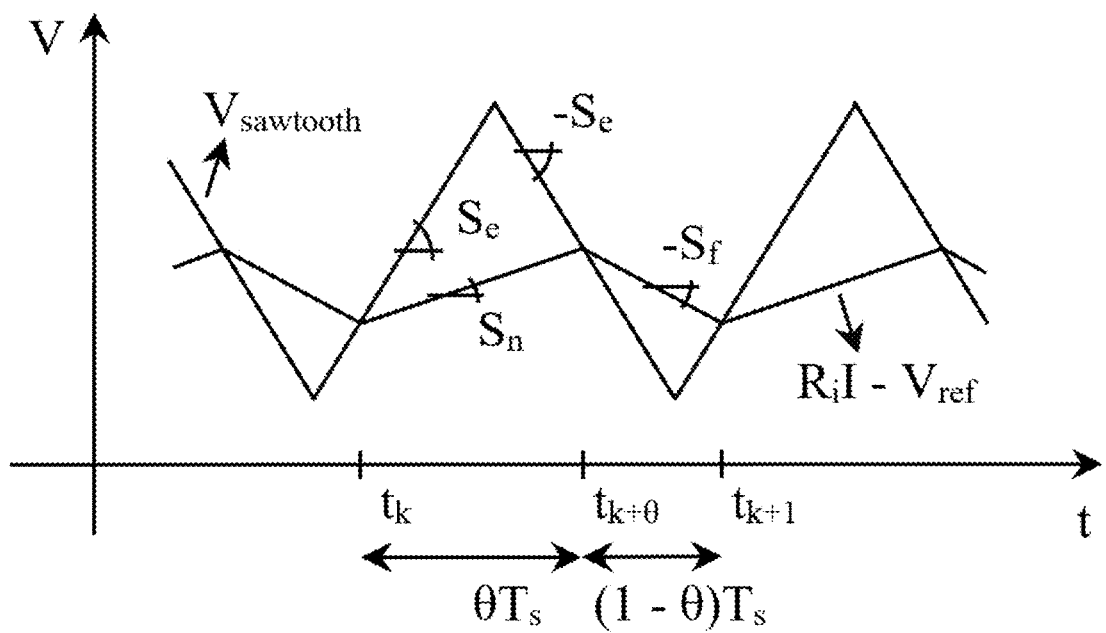
Figure 3:
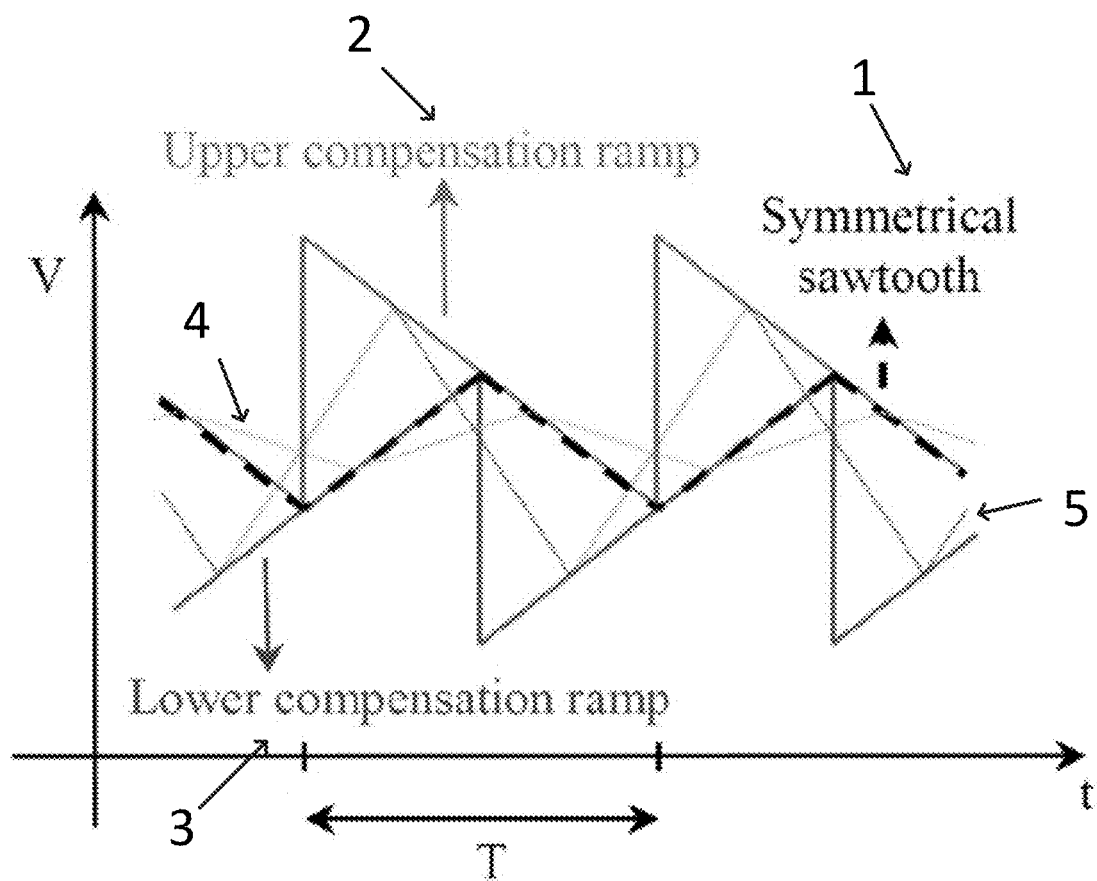
Figure 12:
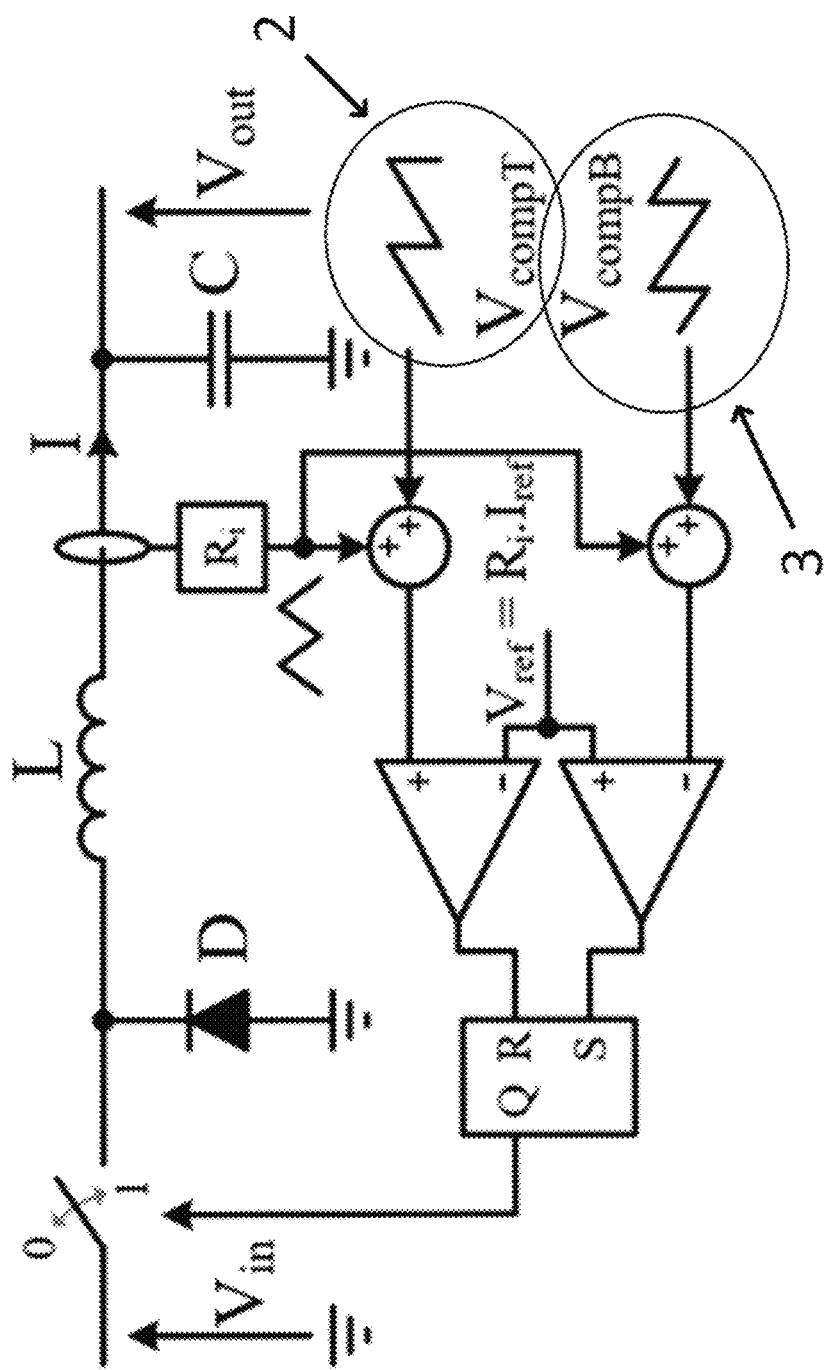
FIG. 12 shows an embodiment of the inventions circuit associated to peak and valley current control.

FIG. 3 details an embodiment of a peak and valley current control scheme as described by the invention employing two asymmetrical compensation ramps in a voltage vs time graph, where T defines the switching period. In FIG. 12 a circuit diagram in an embodiment of the invention is shown. FIG. 12 shows that two asymmetrical compensation ramps are used in the control scheme. Note that in FIG. 12 the inverse of the compensation is shown as compared to FIG. 3, however, these two solutions are numerically equivalent.

The control procedure for conventional symmetrical current control mode (average current control) is to compute the difference between the reference voltage, $V_{ref}$, and the output current measurement, I, hereafter $V_{error}$. The control scheme works by switching between the on and off position when the modulation signal and $V_{error}$ intersect. This allows for the control of the average value of the output current. Such a procedure is conventional within the field of electronic and has been utilized in numerous applications. This procedure restricts the achievable bandwidth frequency, since the bandwidth frequency is limited by the inductance charge slope $S_n$, the inductance discharge slope $S_f$, which shall be lower (in absolute vales) than the slope of the symmetrical sawtooth $S_e$ in absolute value.

As illustrated in FIG. 3, the stripped line 1 indicates a symmetrical sawtooth. Further, an upper asymmetrical compensation ramp 2 and a lower asymmetrical compensation ramp 3 are shown. The dotted line 4 shows the behaviour of the current under conductance control according to a symmetrical sawtooth, which can also be achieve by use of the upper 2 and lower 3 compensation ramps. The inventor has shown that average current control with symmetrical sawtooth control is a particular case of peak and valley current control, where both peak and valley current can be controlled, meaning that the dynamical response of the systems are the same, resulting in that two asymmetrical compensation ramps can be used as a single symmetrical sawtooth.

Replacing a symmetrical sawtooth by two asymmetrical compensation ramps will facilitate the possibility of increasing the loop gain by going from the dotted line 4 to the dotted line 5, thereby enabling a higher frequency bandwidth in the same control system. In conventional systems, one would either use parallel converters to increase the bandwidth, adding to the circuit complexity, or increase the switching frequency, resulting in additional power losses and lower conversion efficiency.

In the current embodiment the current will rebound on the compensation ramps as shown in FIG. 1. The upper (res. lower) compensation ramp, controls the peak (resp. valley) of the current.

Figure 4:
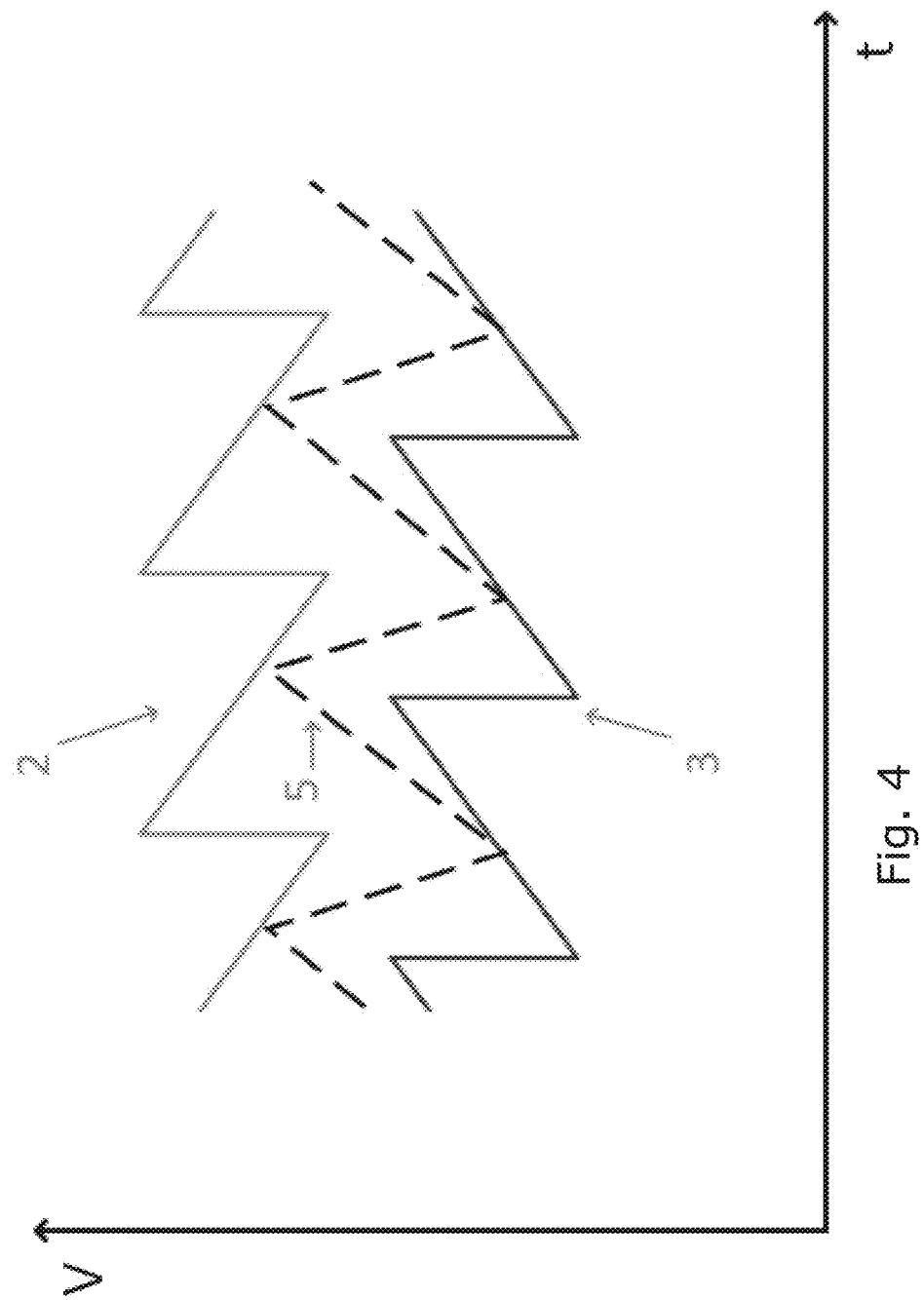

The configuration in such an embodiment enables higher bandwidth and higher loop gain compared to the peak and average asymmetrical current control. As seen in FIG. 3 there might be parasitic crossing in the control scheme wherein it crosses a compensation ramp without requiring a switching. Such parasitic crossing can be removed by increasing the distances between the asymmetrical sawtooth control ramps, as seen in FIG. 4 where the upper and lower compensation ramps have been shifted in voltage. The dashed line 5 has in this embodiment no parasitic crossing and the same bandwidth characteristics.

Figure 5A:
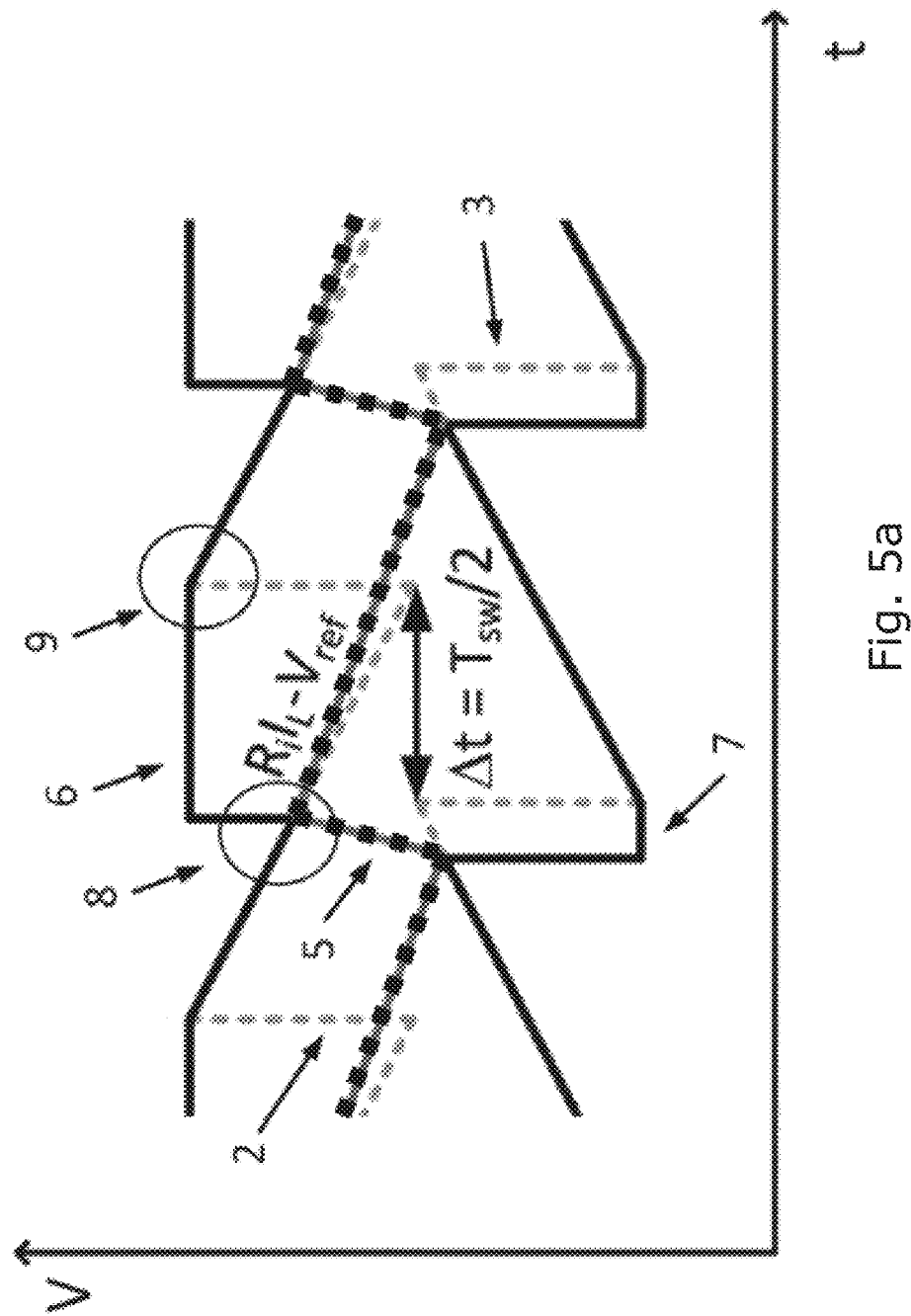

Other methods for removing the parasitic crossing may be to reset the compensation ramps, when a crossing has been made, as seen in FIG. 5*a*, where the compensation ramps are reset when a crossing has been made. In this embodiment we see that the dotted lines 2 and 3 are the lower and upper compensation ramps, which has been reset to, respectively, a higher value for the upper compensation 2, such that it becomes 6, and a lower value for the lower compensation ramp 3 such that it become 7. The resetting means that the compensation ramp, after a crossing, becomes a value, which is out of the reachable interval of the current behaviour 5, until a new cycle begin. E.g. for the lower compensation a crossing occurs in 8, after which a reset of the compensation occurs until a new period 9. In this period the compensation ramps are moved to a value in which a crossing between the current 5 cannot occur.

Figure 5B:
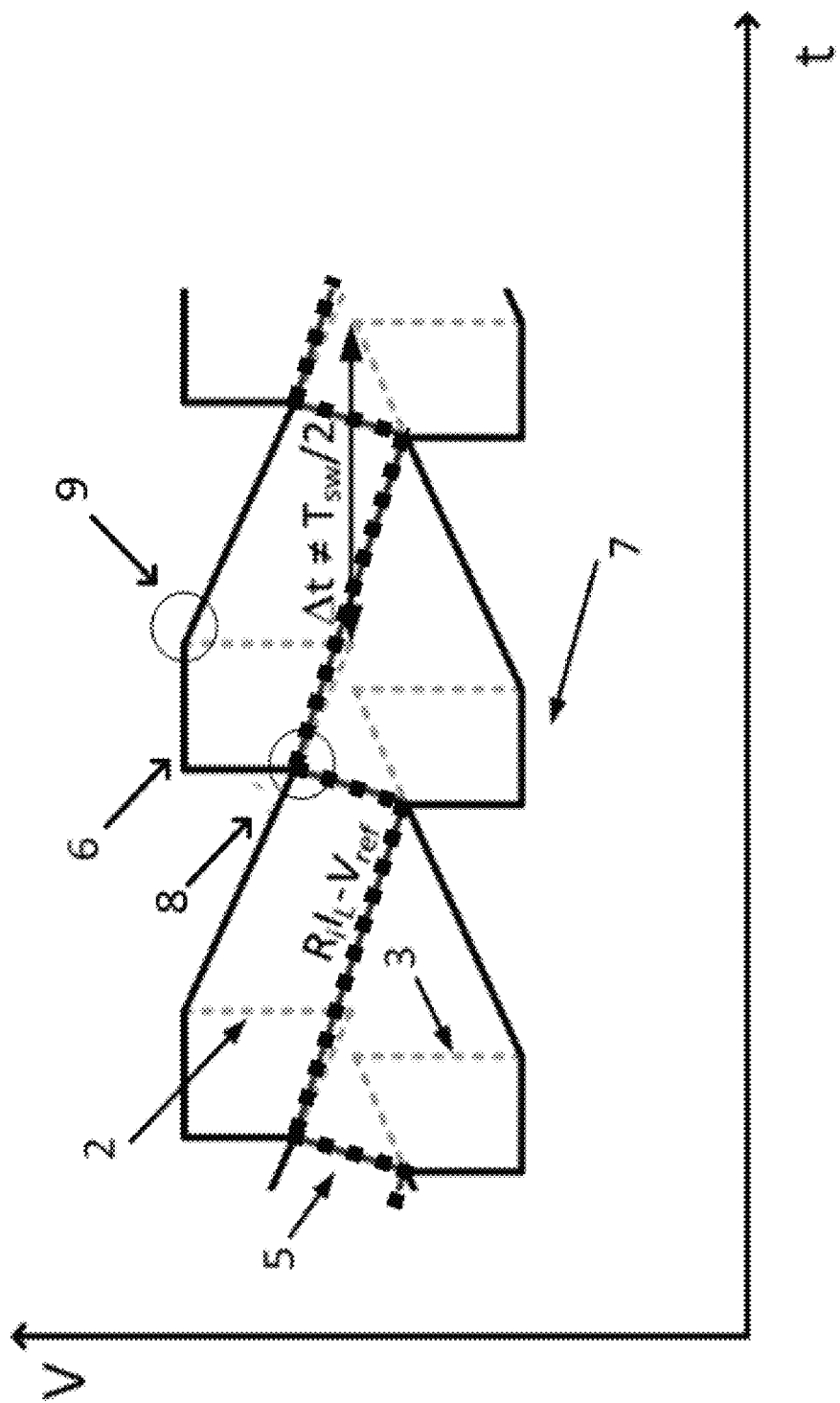

Parasitic crossings may in an embodiment mainly be addressed by a reset, as shown in FIG. 5*a*, but increasing the horizontal distances between the compensation ramps may be beneficial to avoid working at the very beginning or end of a compensation ramp, as seen in FIG. 5*b*. Such a design will improve the robustness of the system as parametric robustness is less of a concern when the crossings occur away from the very beginning or end of a compensation ramp.

FIG. 5*b* shows that shifting the compensation ramps in time, with respect to each other, allows for tailoring the compensation ramps so as to not operate the system very near the beginning or end of a ramp, thereby improving the robustness of the system.

Figure 6:
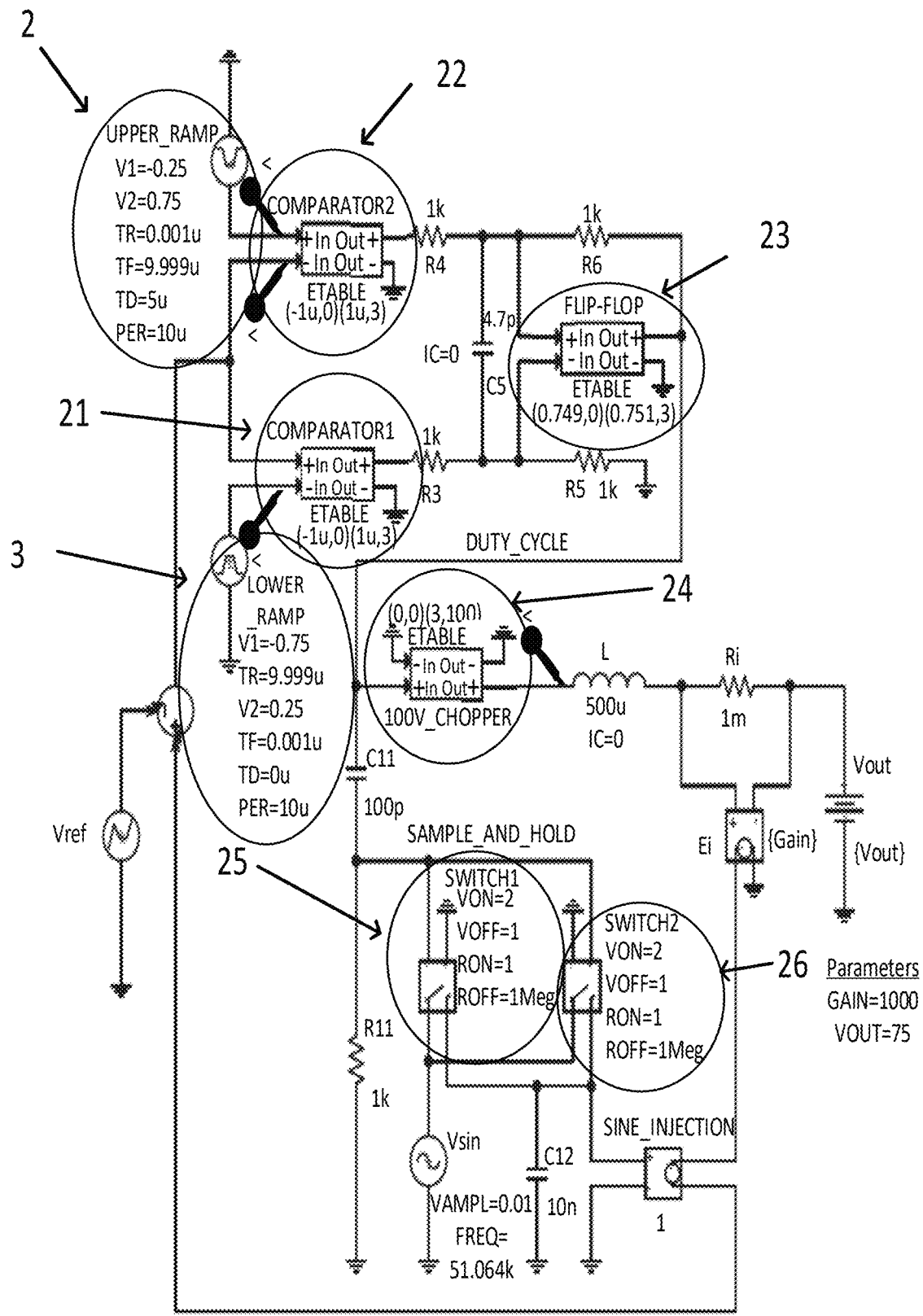

In an embodiment of the invention, the control scheme is implemented using analogue component as detailed in FIG. 6, wherein the separate components of the analogue scheme are detailed.

In FIG. 6 the COMPARATOR1 21 and COMPARATOR2 22, requested to respectively compare the error signal to the lower and upper compensation ramps, will change the status of FLIP-FLOP 23 depending on whether the feedback signal has reached the lower 3 or upper 2 compensation ramps. FLIP-FLOP 23 controls in turns the chopper 24 to increase or decrease the current level. The SWITCH 1 25 and SWITCH 2 26 materialize the provision for injecting a stepwise perturbation allowing the open-loop gain to be measured. Such provision is not necessary for nominal control scheme operation.

Figure 7:
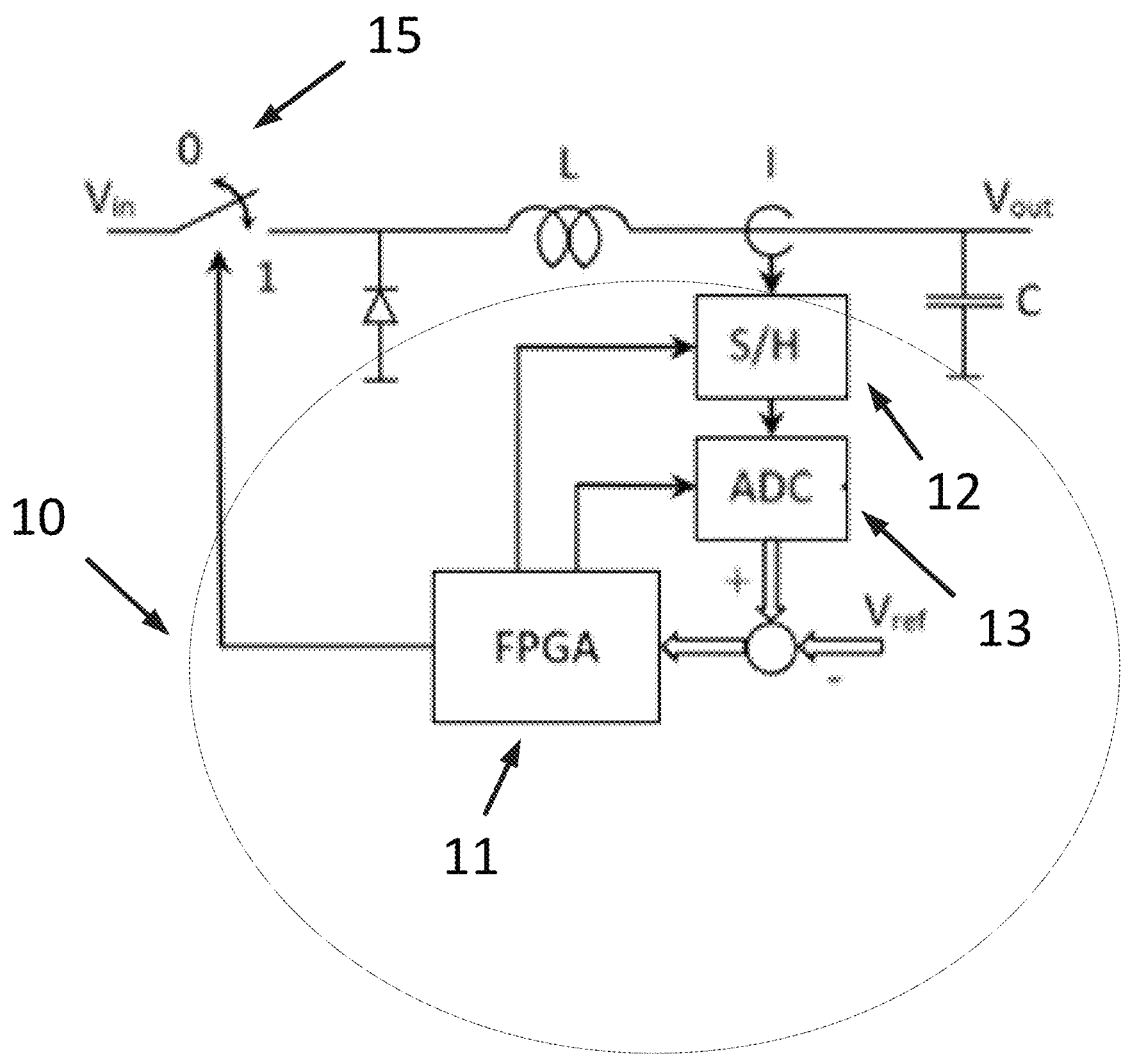

In another embodiment, the peak and valley current control mode can be implemented in a digital current mode control architecture, see FIG. 7. In such an embodiment the control scheme is carried out using a digital current control circuit, the digital current mode control 10 consisting of a field programmable gate array 11, FPGA, a sample and hold circuit 12, S/H, and an Analogue to Digital converter 13, ADC. Note that the FPGA may be replaced by any other numeric circuit able to implement the requested digital operation (e.g. by an ASIC).

The FPGA 11 will trigger the S/H circuit 12 and the ADC 13 will convert the sample into a numerical value to be provided to the FPFA 11, on its request. By repeating such operation at a frequency sufficiently large with respect to the switching frequency of the SMPS, the FPGA can implement numerically the analogue peak and valley current control scheme presented above and control the power switch 15 accordingly.

A more powerful embodiment can however be achieved with this digital architecture. Due to the time-discrete behaviour of the closed-loop dynamics indeed, the deviation of the current from it steady-state waveform is constant in between two switching operations. On the other hand, the targeted steady-state waveform is foreseeable, that is computable by the FPGA, on the basis of the system model. Therefore, a single measurement of the current, performed after each switching operation, is enough to compute and acquire that constant deviation of the current with respect to its steady-state waveform. The current deviation then allows to compute and determine the next switching time in an early way, and to enforce that switching when the time comes. Note that in such system, the upper and lower compensation ramps are virtual. They materialize as slope parameters within the formula foreseeing the next switching time on the basis of the current measurements performed after each switching operation.

Figure 13A:
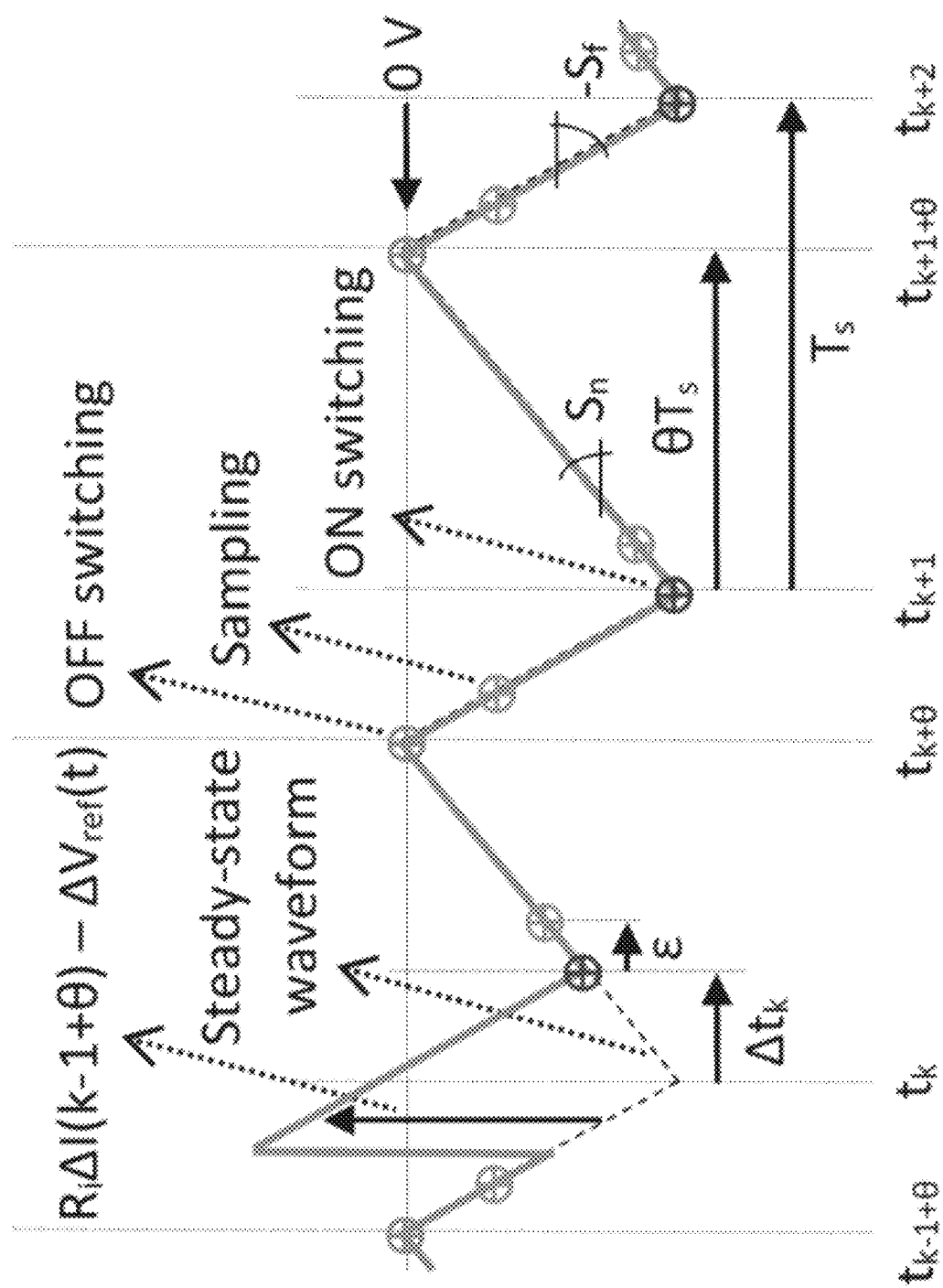
FIGS. 13*a* and 13*b* shows an embodiment of the invention in relation to predictive control with and without reference numerals.
Figure 13B:
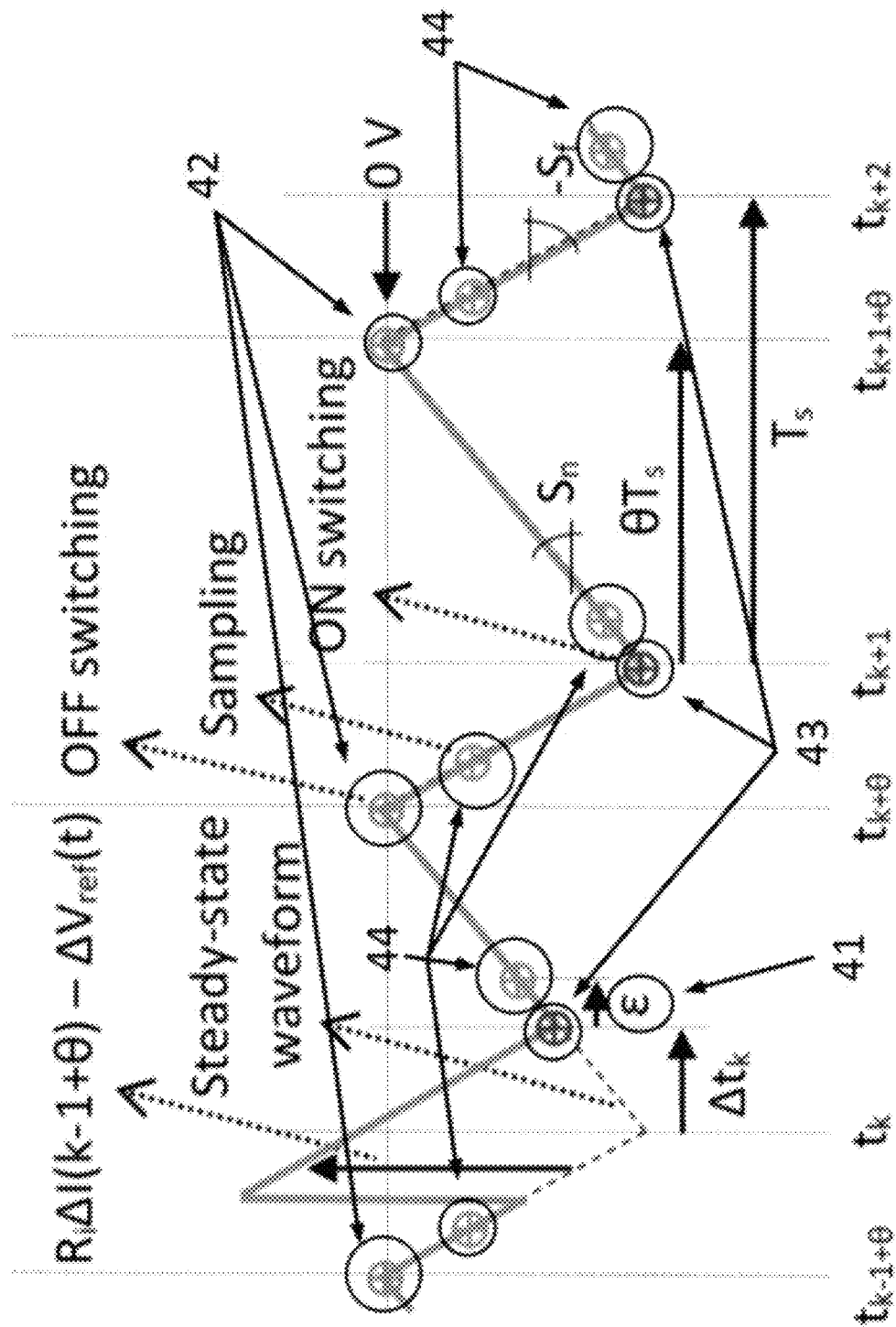

Corresponding waveforms are shown on FIGS. 13*a* and 13*b*, FIG. 13*b* corresponds to FIG. 13*a* including reference numerals. The switching operations controlling the current peak and valley are indicated respectively by the dot labeled 42 and the dot labeled 43. The measurements of the current occur after each switching operation and are indicated by a dot labeled 44. A slight delay 41 between switching and measurement allows for switching noise settling, preventing inaccurate measurement. In the present illustration, a $\Delta V_{ref}$ step occurring before time $t_k$ is completely resorbed at the next switching operation due to the implemented control scheme.

The definite advantage of such scheme is that no continuous operation of a fast ADC is needed. At the contrary, a slower ADC is acceptable, consuming e.g. 10% of the switching period to convert the analogue current measurement into a digital information, leaving the remaining switching period time for the FPGA to compute the next switching time and to implement that switching operation. Such control scheme, referred to as predictive control, proves therefore to be very effective in terms of results achieved with limited additional electronic cost (low speed ADC to be added to the existing digital control FPGA).

In FIG. 8, the performance of the control system in an ideal embodiment is compared with the asymmetrical conductance mode and with the symmetrical average current mode control. It is seen that the bandwidth performance, $F_b/F_s$, of the symmetrical conductance control is a factor 2 better than the asymmetrical one. Further, the symmetrical conductance features a linear relation between average current and duty-cycle. In addition, bandwidth frequency and stability margin change much less with duty-cycle, that is with the output voltage, than for the asymmetrical conductance controls. All this is beneficial for large signal operation.

It must be noted that since the constraint of $S_f<S_e$ for the asymmetrical average control case with falling sawtooth and $S_n<S_e$ and $S_f<S_e$ for the average symmetrical case does not apply to peak current control or peak and valley current control, such that peak (and valley) current control bandwidth surpasses that of the average current control.

Figure 9:
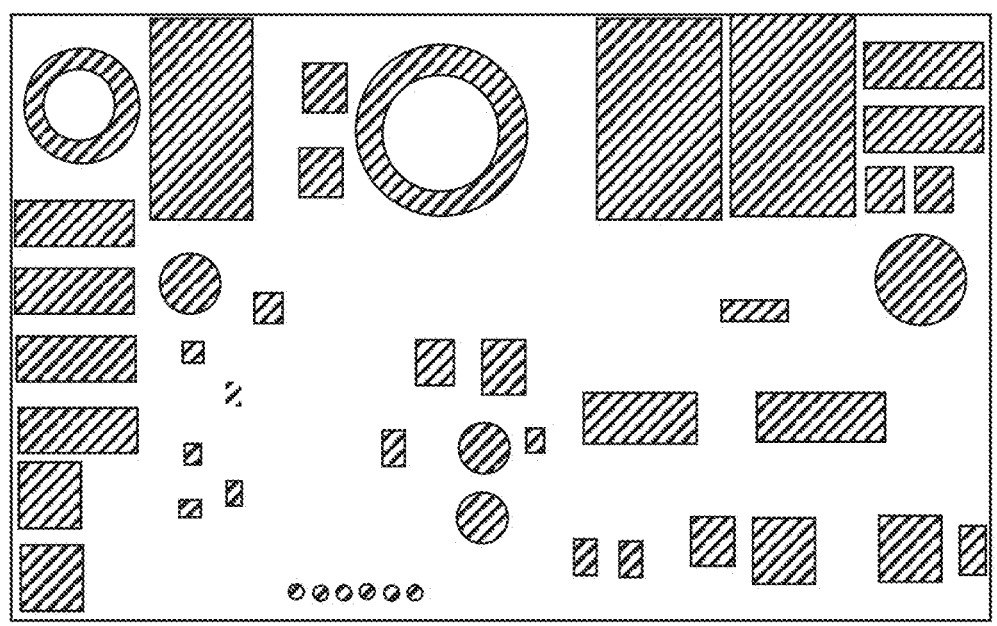

Now referring to FIG. 9, a circuit validating the different control schemes is shown, the results of which will be discussed in connection with FIG. 10.

Figure 10:
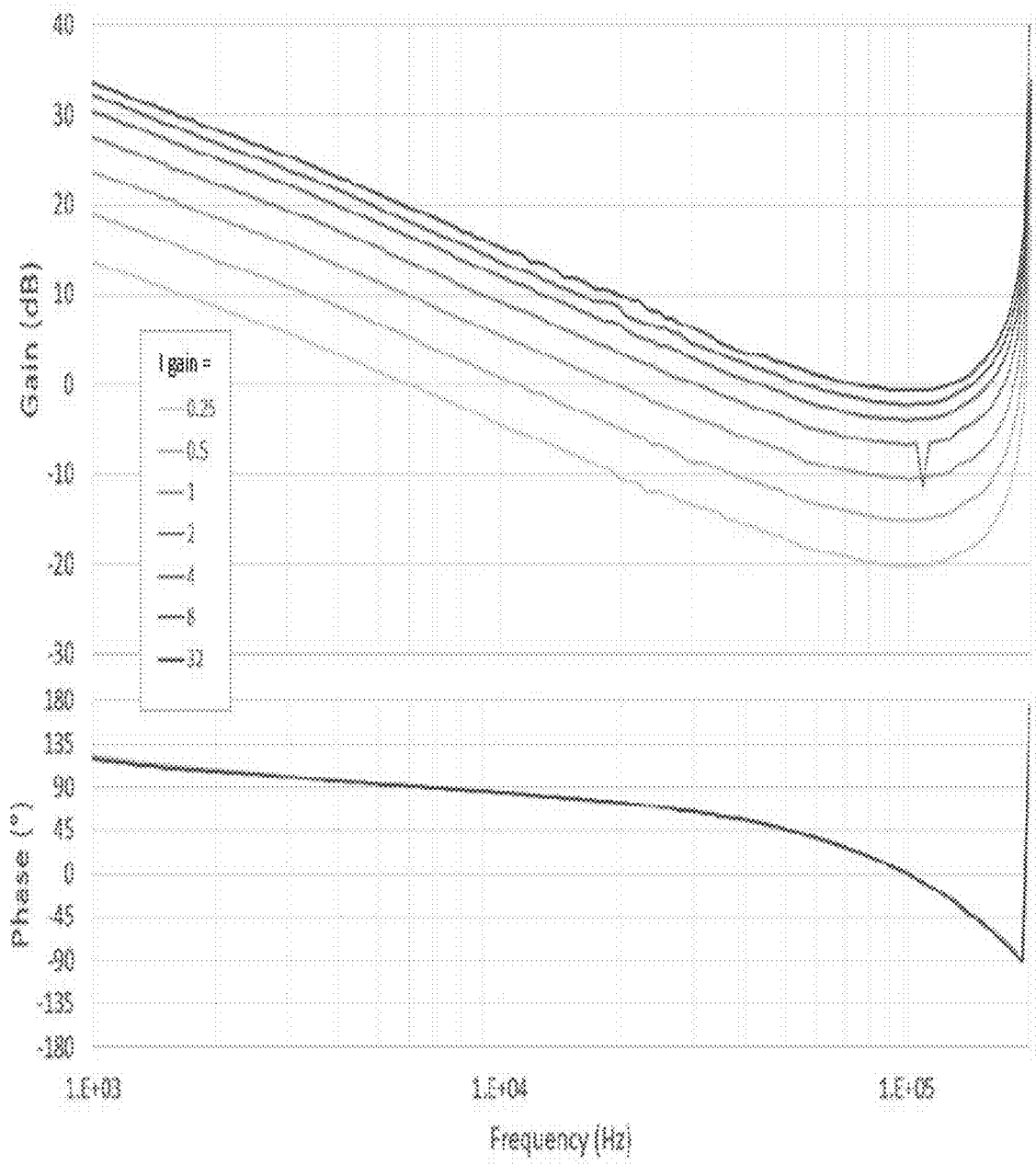
Figure 11:
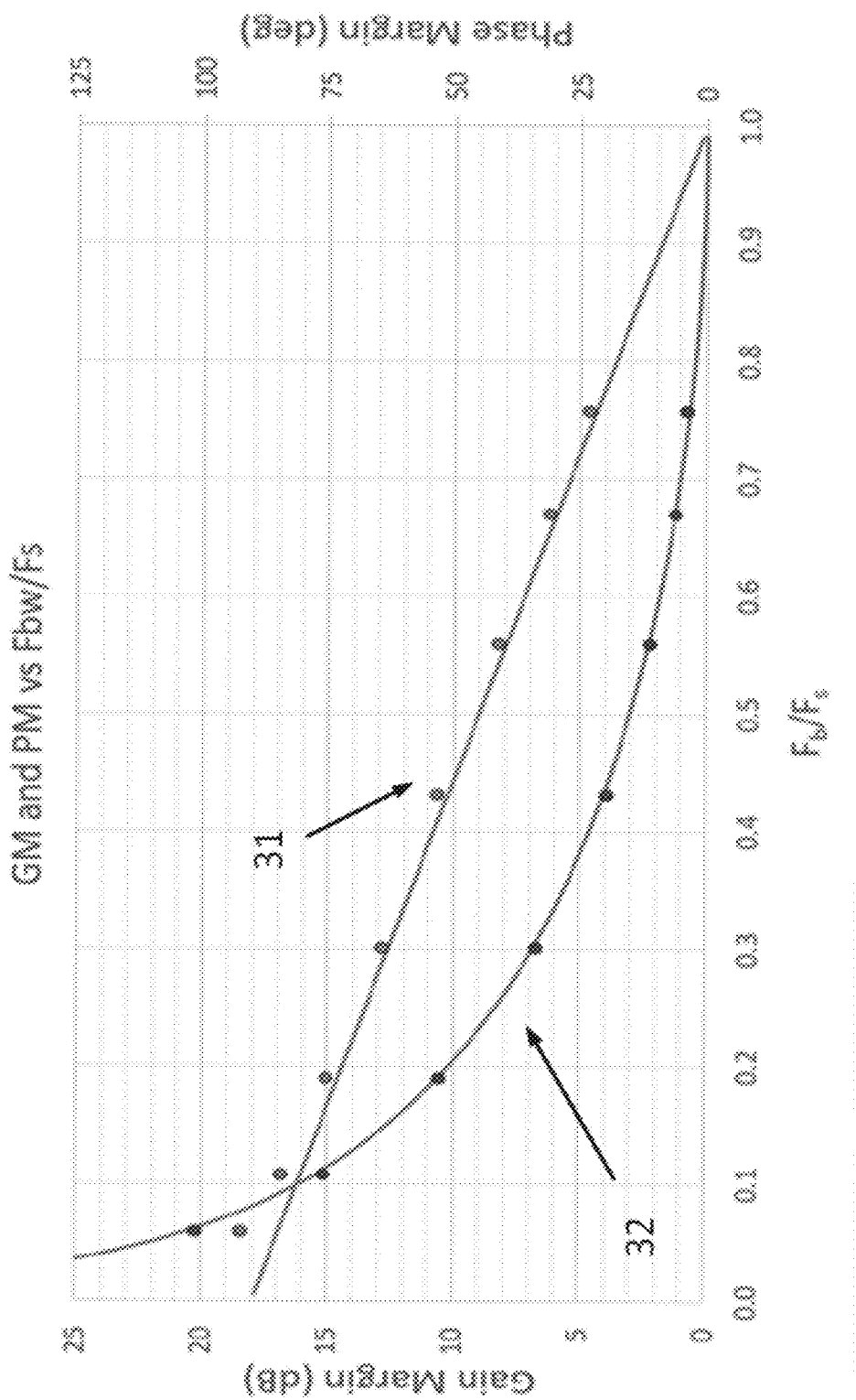

The validation is shown in FIGS. 10 and 11 detailing the open-loop gain and the associated phase and gain margin of the PVCC control scheme. Upper diagram in FIG. 10 indicates the Bode plot amplitude for different gain values. Lower plot of FIG. 10 stands for Bode plot phase and is unaffected by the loop gain. The diagram of FIG. 11 includes the relation between bandwidth on one side, and gain and phase margin on the other side, wherein the upper curve is the phase margin curve 31 and the lower curve is the gain margin curve 32. The continuous lines are relevant to theoretical figures, while measurements are indicated by dots, which are in good accordance with the theoretical forecast.

In FIG. 12 an embodiment shows a circuit of the compensation ramp. In this embodiment the inverse of the ramp is added to the current, depending on the input of the comparator that is chosen, such that signal is flipped in sign. The basic mechanisms of the invention remains the same, as the upper compensation ramp will then have a positive slope, while the lower compensation ramp has a negative slope. This will be the same control scheme was discussed in connection with FIG. 3.

The invention can be implemented by means of hardware, software, firmware or any combination of these. The invention or some of the features thereof can also be implemented as software running on one or more data processors and/or digital signal processors.

The individual elements of an embodiment of the invention may be physically, functionally and logically implemented in any suitable way such as in a single unit, in a plurality of units or as part of separate functional units. The invention may be implemented in a single unit or be both physically and functionally distributed between different units and processors.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

REFERENCE NUMERALS

1 Symmetrical sawtooth
2 Upper asymmetrical sawtooth
3 Lower asymmetrical sawtooth
4 Current behaviour
5 Current behaviour
6 Reset upper compensation
7 Reset lower compensation ramp
8 Start of reset period
9 End of reset period
10 Digital current mode control
11 Field programmable gate array
12 Sample and hold circuit
13 Analogue to digital converter
15 Power switch 21 COMPARATOR1
22 COMPARATOR2
23 FLIP-FLOP
24 CHOPPER
25 SWITCH 1
26 SWITCH 2
31 Phase margin curve
32 Gain margin curve
41 Delay
42 Current peaks
43 Current valleys
44 Switching operations

REFERENCE TO LITERATURE (Ridley, 1990) R. B. Ridley, "A New Small-Signal Model for Current-Mode Control", Dissertation submitted for the degree of PhD, 27 Nov. 1990

The invention claimed is:

1. A method for controlling peak and valley of a controlled current in a switched mode power supply comprising a current mode control loop, a switch, and being connected to an electrical power source, the method comprising:
   providing an upper compensation ramp signal for controlling a peak of the controlled current, the upper compensation ramp signal being a sawtooth signal with a negative, falling, substantially linear slope, $-S_{e,Upper}$, starting periodically in time,
   providing a lower compensation ramp signal for controlling a valley of the controlled current, the lower compensation ramp signal being a sawtooth signal with a positive, raising, substantially linear slope, $S_{e,Lower}$, starting periodically in time,
   providing a reference voltage signal, $V_{ref}$, to the control loop,
   obtaining a signal indicative of the controlled current, I,
   comparing alternatingly the signal indicative of the controlled current referenced to the reference voltage signal to the lower compensation ramp and the upper compensation ramp, respectively, to switch on or off the switch into the control loop, and
   switching the electrical power with modulation at a fixed frequency, $f_s$.

2. The method according to claim 1, wherein the upper compensation ramp signal and the lower compensation ramp signal are separated in voltage by a predetermined offset.

3. The method according to claim 1, wherein the lower compensation ramp is reset to a low state when the current signal has crossed the lower compensation ramp, and the upper compensation ramp is reset to a high state when the current signal has crossed the upper compensation ramp.

4. The method according to claim 1, wherein the upper compensation ramp signal and the lower compensation ramp signal are separated in time by a predetermined offset.

5. The method according to claim 1, wherein the step of obtaining a signal indicative of the controlled current is performed by measuring the controlled current.

6. The method according to claim 1, wherein the step of obtaining a signal indicative of the controlled current is performed by obtaining a time-derivative of a voltage developed over a capacitor by the controlled current.

7. The method according to claim 1, wherein the switched mode power supply connected to the electrical power source is switched on/off with pulse width modulation, PWM.

8. The method according to claim 1, wherein the fixed switching frequency, $f_s$, of the switched mode power supply is about 1 kHz to about 100 MHz.

9. The method according to claim 1, wherein the slope of the upper compensating ramp signal is substantially numerically equal to the slope of the lower compensating ramp signal, $S_{e,Upper}=S_{e,Lower}$.

10. The method according to claim 1, wherein the numerical value of the slope of the upper compensating ramp signal is different from the slope of the lower compensating ramp signal, $S_{e,Upper} \neq S_{e,Lower}$.

11. A method for voltage mode control in a voltage mode control loop, wherein the voltage mode control loop comprises a current mode control loop according to claim 1.

12. A method for voltage mode control in a voltage mode control loop, wherein the voltage mode control loop comprises a signal indicative of the controlled current obtained by time-derivative of the voltage developed over a capacitor by the controlled current according to claim 1.

* * * * *